United States Patent [19]
LaRue et al.

[11] 3,904,481

[45] Sept. 9, 1975

[54] DETERMINATION OF NITROGENASE

[75] Inventors: Thomas Alfred LaRue; Wolfgang Gebhard Walter Kurz, both of Saskatoon, Canada

[73] Assignee: Canadian Patents and Development Limited, Ottawa, Canada

[22] Filed: Aug. 30, 1973

[21] Appl. No.: 393,007

[30] Foreign Application Priority Data
Sept. 15, 1972 Canada.............................. 151822

[52] U.S. Cl............................ 195/103.5 R; 195/50
[51] Int. Cl.$^2$........................ C07G 7/02; C12K 1/00
[58] Field of Search...... 195/103.5 R, 50; 23/252 R, 23/230 B

[56] References Cited
UNITED STATES PATENTS
3,591,458  7/1971  Hardy ........................... 195/103.5 R
3,738,815  6/1973  Pawloski et al. ............... 23/252 R X OTHER PUBLICATIONS
Lemieux et al., Periodate–Permanganate Oxidations. Canadian Journal of Chemistry, Vol. 33, 1955 (pp. 1701–1709) QD1C2.

Fieser et al., Advanced Organic Chemistry. Reinhold Publishing Corporation, 1962 (pp. 182–196) QD251F52.

Nash, T., The Colorimetric Estimation of Formaldehyde by Means of the Hantzsch Reaction. Biochemical Journal Vol. 55, 1955 (pp. 416–421) QP501B47.

*Primary Examiner*—David M. Naff
*Attorney, Agent, or Firm*—Alan A. Thomson

[57] ABSTRACT

In a mixture of ethylene and acetylene, the ethylene is selectively oxidized to formaldehyde. This oxidation is used in the determination of nitrogenase (nitrogen fixation) activity where ethylene produced by the enzyme from added acetylene, has to be measured. The formaldehyde produced from the ethylene is proportional to the enzyme activity, and can be assayed colorimetrically or otherwise.

6 Claims, No Drawings

DETERMINATION OF NITROGENASE

A basic feature of the invention is the selective oxidation of ethylene to formaldehyde in the presence of acetylene. This invention is further directed to the measurement of nitrogenase in selected plant tissues or soil materials for the purpose of determining relative nitrogen fixation capacity.

INTRODUCTION

The conversions of atmospheric nitrogen to ammonia is known as nitrogen fixation. In nature, several organisms possess the enzyme nitrogenase, which catalyses the reduction of nitrogen to ammonia. These include some blue-green algae and some bacteria which are able to fix nitrogen when free living. In agriculture, however, the most important manifestation of nitrogen fixation is symbiotic nitrogen fixation. In this process, some plants (mostly legumes) are infected by a specific bacterium which multiplies in the roots to form a nodule. In this close association, the bacteria form nitrogenase. Nitrogen can then be reduced to ammonia. The plant or bacterium alone are unable to fix nitrogen.

Because fixed nitrogen is a major requirement for plant growth, the contribution of nitrogen fixation to agriculture is important. The estimation of fixation has been done in three ways: (1) total nitrogen analysis (2) use of the $^{15}N_2$ isotope and (3) the reduction of nitrogenase of artificial substrates. (Postgate, "The Chemistry and Biochemistry of Nitrogen Fixation", Plenum Press, London, 1971). Both (1) and (2) have inherent limitations due to involved procedures and equipment required.

This latter technique (3) is based on the observation that nitrogenase can reduce a variety of substrates containing triple bonds, such as acetylenes, nitriles, isonitriles and azides. Several of these provided potentials for novel assays, but only one has been developed. The reduction of acetylene to ethylene provides a convenient assay, for the gases can be separated and measured by gas chromatography (R. W. F. Hardy U.S. Pat. No. 3,591,458 July 6, 1971).

The gas chromatographic assay requires expensive equipment. Therefore the full potential of the assay has not been realized. The conversion of the acetylene to ethylene cannot be measured in labs lacking GC facilities.

Because the chemical properties of acetylene and ethylene are similar, it was not recognized that ethylene could be determined chemically in the presence of acetylene. Therefore previous assays have depended on the prior physical separation of ethylene from other gases (Note Hardy U.S. Pat. No. 3,591,458, Col. 2, lines 51 and 66).

It would be desirable to determine ethylene chemically in the presence of acetylene i.e. without a sophisticated separation step being necessary.

We have now found that it is possible to selectively oxidize only the ethylene to formaldehyde in the presence of acetylene.

DESCRIPTION OF THE INVENTION

The gaseous mixture containing ethylene and acetylene is contacted with an oxidant which will oxidize ethylene to formaldehyde but not further (during a period of up to about two hours). Some oxidant systems which will accomplish this are mentioned in Fieser and Fieser "Advanced Organic Chemistry" Reinhold, 1961 page 192–193. These oxidants usually comprise a co-oxidant or catalyst which may be regenerated by the primary oxidant in situ. Unexpectedly the acetylene is not oxidized appreciably and does not interfere.

The preferred oxidant is a mixture of permanganate and periodate salts e.g. potassium permanganate and sodium metaperiodate. These per-salts are dissolved in water and used at near neutral or slightly alkaline pH. The relative proportions of periodate to permanganate salt are not critical but a suitable mole ratio range for best results is from about 50:1 to about 100:1. The amount of oxidant needed per mole of ethylene may be readily determined - or calculated. Where an unknown amount of ethylene is present, an excess of oxidant will be used. (Acetylene itself will slowly use up small amounts of oxidant). Further details on this oxidant system are given in Lemieux et al Canadian J. Chem. Vol. 33 (1955) pages 1701–1709. Osmium tetroxide can replace the permanganate.

The reaction should not be prolonged after all of the ethylene has been oxidized since slow oxidation of acetylene to products other than formaldehyde, and slow oxidation of formaldehyde itself is possible.

The overall assay technique of the invention includes the incubation of a nitrogen-fixing system in an atmosphere containing acetylene. A portion of the modified atmosphere is then analyzed (for ethylene) by oxidizing only the ethylene to formaldehyde with the latter being assayed e.g. by color change or spectrophotometrically. This gives a direct measure of the nitrogen-fixing ability of the system.

The resulting formaldehyde can be reacted with any reagent known to give a marked color change. One colorimetric reagent preferred for economy and convenience is acetylacetone in ammonium sulphate (see T. Nash, Biochem J. Vol. 55 (1953) page 416). Another acceptable reagent is 4-amino-3-hydrazino-5-mercapto-1,2,4-triazole which gives a purple color. However others have been used before such as chromotropic acid in concentrated sulfuric acid, and can be applied here.

For field use it is desirable to have a simple apparatus or kit ready for carrying out the assay. A kit of pre-weighed and suitably packaged chemicals and reagents is very convenient. A closed vessel into which the sample and the acetylene are introduced, is normally used for the initial incubation. A separate (or connected) vessel is included for the oxidation step. The oxidant can be provided as a liquid but for ease of handling, a solid form has been found most convenient. Another vessel containing the color-forming reagent completes the apparatus or kit. This latter vessel should be transparent and clear to allow the color to be observed.

A suitable solid form of oxidant can be provided by absorbing the active components on a solid support such as diatomaceous earth, bentonite, carbon powder, porous alumina etc. The support should be porous or finely divided and of high surface area to allow ready access of the ethylene to the oxidant.

The vessel for the oxidation may be in the form of a syringe containing the oxidant on a solid support. A filter is desirable incorporated next to the syringe needle to prevent solids from the sample from entering, and any support solids from leaving, the syringe.

Other vessel designs, including interconnected ones are possible. It is only necessary that after incubation the gas phase or portion thereof be brought into contact with the oxidant, and that the formaldehyde then be contacted with the color-forming reagent.

The following EXAMPLES are illustrative.

EXAMPLE I Quantitative Estimation of Nitrogenase

Pea plants were carefully uprooted, and the roots cut off. The roots were individually placed in small (140 cc) jars fitted with airtight lids containing a serum cap. Three ml of $C_2H_2$ was injected into the jar. After a suitable time interval (usually 30 or 60 min.), 1 to 10 ml of gas phase was removed by syringe from each jar. The gas sample was transferred to a flask (fitted with a serum cap) containing 1½ cc of oxidant.

The oxidant contained, per liter of water, 0.04 moles of sodium metaperiodate, 0.0005 moles of potassium permanganate and sufficient potassium hydroxide to adjust the pH to 7.5.

The flasks were shaken vigorously for 90 minutes, and the excess oxidant destroyed by the addition of 0.25 cc 4M $NaAsO_2$ and 0.25 cc of 4N $H_2SO_4$. One cc of Nash's reagent (150 g Ammonium acetate, 3 cc acetic acid, 2 cc acetylacetone per Liter $H_2O$) was added. The resulting yellow color was measured spectrophotometrically at 415 m$\mu$. (The yellow product flouresces, and a spectrofluorometric assay is therefore possible. See Sawicki and Carnes, Mikrochim. Acta 1968 Pages 148–159).

Gas standards containing known amounts of $C_2H_2$ and $C_2H_4$ were similarly treated. These provided a standard curve demonostrating that the optical density of the yellow color was proportional to $C_2H_4$ concentration over the range of 0.1–2 $\mu$moles $C_2H_4$/sample. $C_2H_2$ was not oxidized to formaldehyde, and its presence in the amounts normally used in the nitrogenase assay did not interfere with the determination of $C_2H_4$.

The results are given in Table 1.

TABLE 1

| Age of Plant (Days after planting) | Nitrogenase Activity moles $C_2H_4$/plant/hr var Trapper | (means of 4 plants) var. Laxtons Progress |
|---|---|---|
| 19 | 1.34 | 0.01 |
| 25 | 2.31 | 3.58 |
| 33 | 3.05 | 2.78 |
| 40 | 7.66 | 5.22 |
| 47 | 9.59 | 5.88 |
| 54 | 17.20 | 3.49 |
| 59 | 8.75 | 0.01 |
| 67 | .70 | — |

These results are similar to those described by Hardy for soybeans (see Hardy et al, Plant Physiol. 43, page 1185 (1968). There is an exponential increase in nitrogenase activity, followed by a rapid drop when pods start to fill.

The activity of nitrogenase over the growing season can be integrated. Hardy (see paper presented to the 12th Pacific Science Congress, Canberra, 1971) has reviewed the methods by which the fixation of nitrogen can be correlated with the reduction of acetylene. Using such a calibration, the integrated reduction of acetylene over the growing season can yield an estimate of the total nitrogen fixed by the plants. In the 1971 season, colorimetric assays were conducted on four varieties of pea. The calculated nitrogen fixation was:

TABLE 2

| Pea Variety | Fixed mgm N/plant/season |
|---|---|
| Trapper | 207 |
| MP 766 | 497 |
| 340 | 197 |
| Laxtons Progress | 100 |

EXAMPLE II Qualitative Detection of Nitrogenase in the Field

The kit for a single nitrogenase assay consisted of e.g.

a. a syringe containing 1.5 gm of a solid support on which is absorbed a mixture of $KMnO_4$ and $NaIO_4$. A suitable solid oxidant was obtained by mixing "Celite" (trademark for a diatomaceous earth) and the oxidizing medium in Example I, 1:1 (w:v), and drying with warm air until the Celite was powdery. A glass wool filter was positioned between two screens at the syringe opening. (A closed incubation vessel was used for the initial step.)

b. a clear glass test tube, sealed with a serum cap, containing 5 mgm of 4-amino-3-hydrazino-5-mercapto-1,2,4-triazole.

In use, the plant root was incubated as before in the closed vessel containing $C_2H_2$. A portion of the gas phase was drawn into the syringe (a), which was allowed to stand 1–2 hours. In this time the ethylene was oxidized to formaldehyde, and the HCHO remained bound to the Celite. Three cc of 1 M NaOH were drawn into the syringe, then expelled into the text tube. The alkali dissolved the formaldehyde, which then reacted in the test tube with the 4-amino-3-hydrazino-5-mercapto-1,2,4-triazole to form a brightly colored purple derivative.

The appearance of the purple color may be accepted as a qualitative test for nitrogenase in the root sample. By using e.g. a battery-operated colorimeter, or a color-comparator chart, the assay can be made quantitative.

The oxidation step or the assay can be useful in other contexts. For instance ethylene could be determined in atmospheres in situations where safety requirement require monitoring of air for ethylene, or in certain controlled atmospheres for fruit ripening or storage.

I claim:

1. A process for determining nitrogenase activity comprising:
    a. incubating a nitrogenase-containing material with an atmosphere containing acetylene until acetylene is reduced to ethylene to produce an atmosphere containing a mixture of acetylene and ethylene;
    b. contacting at least a portion of said atmosphere mixture containing ethylene and acetylene with an oxidant comprising a periodate salt and a catalyst selected from the group consisting of a permanganate salt and osmium tetroxide to convert ethylene to formaldehyde without oxidizing acetylene significantly, and
    c. determining the formaldehyde so produced to give a direct measure of nitrogenase activity.

2. The process of claim 1 wherein the oxidant comprises a permanganate and a periodate salt.

3. The process of claim 1 wherein the formaldehyde is measured colorimetrically.

4. The process of claim 1 wherein the formaldehyde measurement is carried out by contact with acetylacetone and ammonium sulphate and observing the color change spectrophotometrically.

5. The process of claim 1 wherein the formaldehyde measurement is carried out by contact with 4-amino-3-hydrazino-5-mercapto-1,2,4-triazole and observing the color change.

6. The process of claim 1 wherein the oxidant is absorbed on a porous or finely divided solid substrate.

* * * * *